Feb. 12, 1963
V. C. BOWMAN
3,077,216
POTATO CUTTING MACHINE
Filed Feb. 1, 1960
3 Sheets-Sheet 2
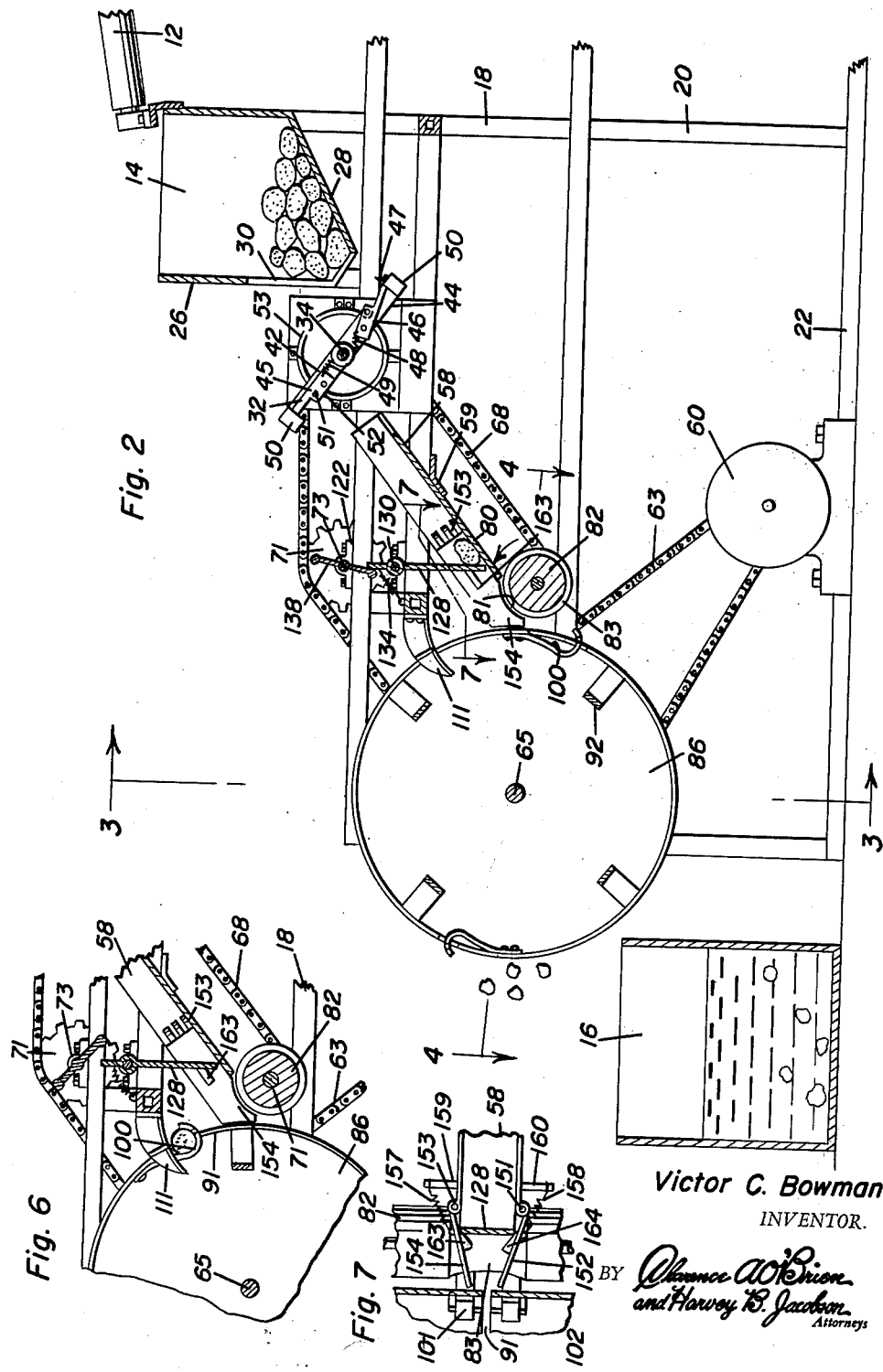
Victor C. Bowman
INVENTOR.
BY Clarence A. O'Brien
and Harvey B. Jacobson
Attorneys

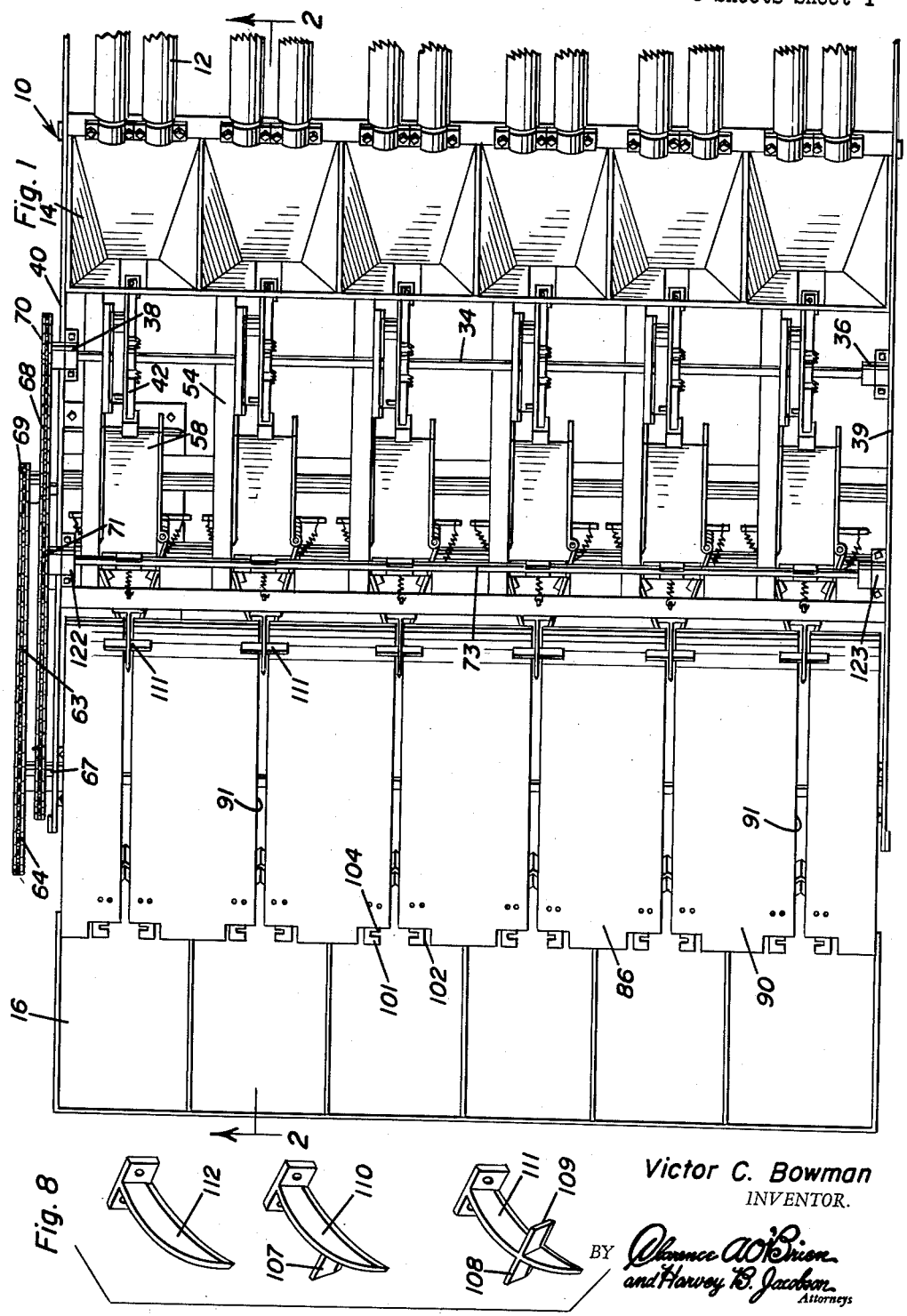

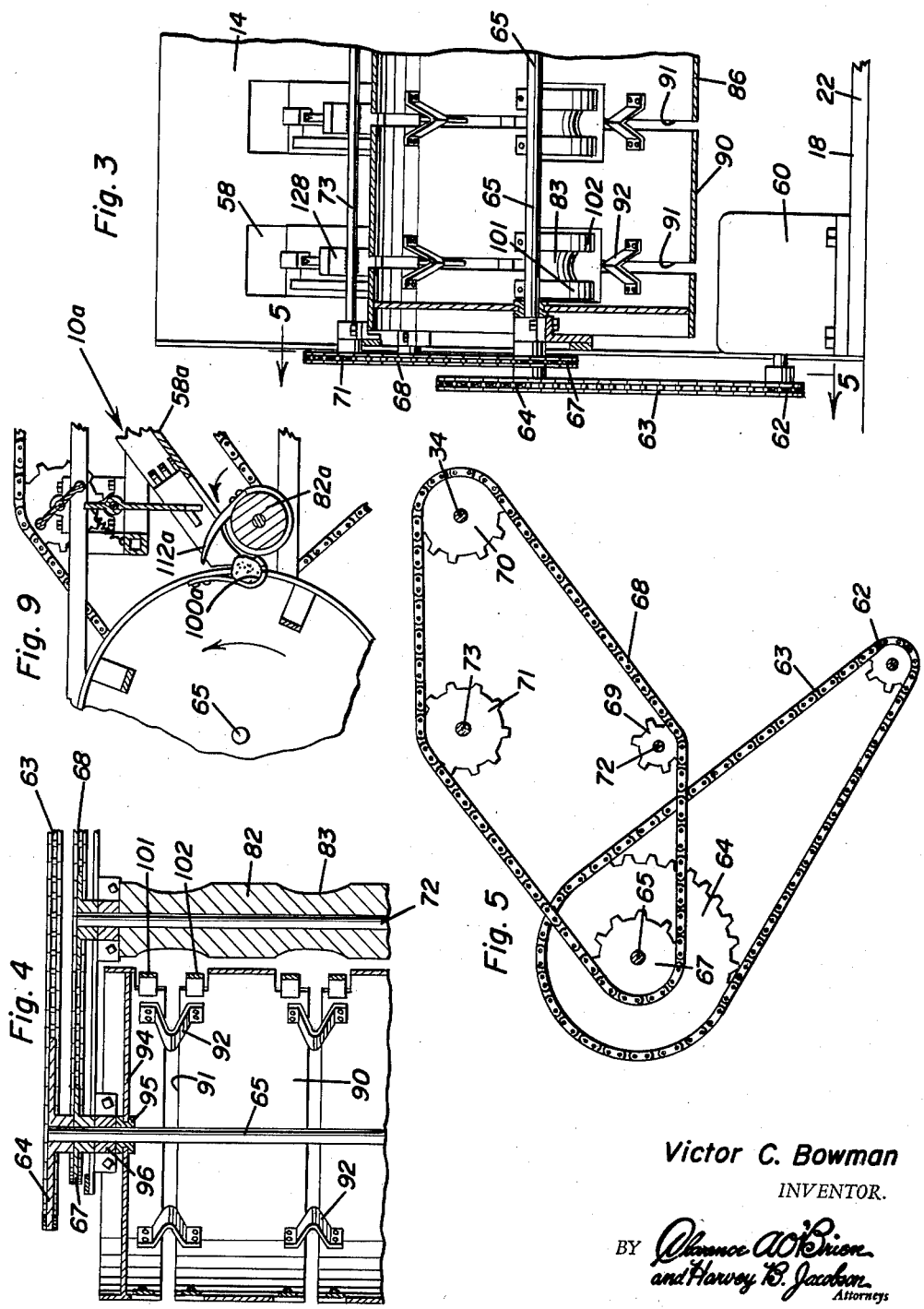

United States Patent Office 3,077,216
Patented Feb. 12, 1963

3,077,216
POTATO CUTTING MACHINE
Victor C. Bowman, Hazleton, Idaho
(Box 537, Hailey, Idaho)
Filed Feb. 1, 1960, Ser. No. 6,007
8 Claims. (Cl. 146—164)

This invention relates to potato cutting machines and more particularly to potato cutting machines for sectioning seed potatoes.

An object of the invention is to provide structural improvements and both functional and operational refinements in potato cutting machines.

Briefly, a machine in accordance with the invention is capable of handling potatoes at high speeds and very smoothly and effectively cut the potatoes in halves, quarters, or any other proportion.

The machine is built on a suitable structural frame and preferably has a number of identical channels fed from a single hopper or a plurality of hoppers, and the potatoes are required to undergo a predetermined course prior to and after admission to a cutting station.

In following the predetermined course, the potatoes are metered, i.e., fed individually into potato receiving pockets of a rotary drum, the pockets defining the cutting station in each channel.

After the potatoes are severed, they are conveyed by the same drum to a vat or a plurality of vats or onto a conveyor or some other suitable receptacle for further processing.

Accordingly, it is a further object of the invention to provide a potato cutting machine possessing the features and structural organization referred to above, and which has been found to function very effectively in performing its intended operation.

Although the machine is capable of a comparatively high speed and large output, the machine is quite simple from a mechanical standpoint.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a top view of a machine in accordance with the invention.

FIGURE 2 is a sectional view taken approximately on the line 2—2 of FIGURE 1.

FIGURE 3 is a sectional view taken on line 3—3 of FIGURE 2.

FIGURE 4 is a sectional view taken on the line 4—4 of FIGURE 2.

FIGURE 5 is a sectional view taken on the line 5—5 of FIGURE 3.

FIGURE 6 is an enlarged fragmentary sectional view showing a portion of the structure illustrated in FIGURE 2 but in another position.

FIGURE 7 is an enlarged sectional view taken approximately on the line 7—7 of FIGURE 2.

FIGURE 8 is a perspective view showing a group of knives to be used in the machine of FIGURE 1.

FIGURE 9 is an enlarged fragmentary sectional view showing a modification of the machine.

In the accompanying drawings, there is an illustration of a machine 10 (FIGURE 1) fed from a grader 12 which is only fragmentarily illustrated. The grader is not the only type of feed on machine 10 but merely diagrammatically represents the fact that potatoes are fed into the group of hoppers 14 at the potato intake end of the machine. Vats 16 are at the potato discharge end of the machine and here again the vats merely diagrammatically represent a suitable receptacle for receiving the sectioned potatoes after processing by machine 10.

Structurally, machine 10 is made of a main frame 18, and the configuration of the frame is inconsequential so long as it serves the intended purpose of supporting the various components of the machine in a proper relationship with respect to each other. In other words, although frame 18 possesses leg 20, a base 22 and various other structural members which are identified subsequently, the frame 18 may assume various different shapes and structural arrangements and serve its intended purpose equally as well.

Hoppers 14 have hopper walls 26 and hopper bottom walls 28 with a discharge opening 30 formed in part in one of the hopper walls and in part in the hopper bottom wall 28. The potatoes are fed in the open top ends of each of the hoppers and they are received at discharge opening 30. The hoppers 14 are located at a comparatively high position on the frame 18.

A potato extractor assembly 32 is carried by frame 18 and is loctaed in front of hoppers 14. The extractor is composed of a transverse shaft 34 mounted in bearings 36 and 38 (FIGURE 1) attached to frame side members 39 and 40. Individual extractors 42 which are very similar to the extractors disclosed in my prior Patent No. 2,850,062 and, as such, typical extractor (FIGURE 2) is made of a transverse bar 44 attached to shaft 34 and having a pair of short rocker arms 45 and 46 pivoted to one face of the bar 44. Potato impaling pins 47 are secured to the ends of the arms, and the arms are biased by springs 48 and 49 in a direction so that the pins 47 extend outwardly from pockets formed by U-shaped ends 50 on bar 44. Each extractor arm has an operating pin 51 projecting laterally therefrom, and when the extractor is rotated, the pins 51 contact stationary abutment 52 which is attached to a ring 53 fixed to transverse frame members 54 of frame 18. In operation of the extractor unit 42, shaft 34 is rotated, thereby rotating bar 44, and the extractor pins 47 in the extended position enter opening 30, impale a potato and carry the potato around to the eject position at which pin 51 strikes abutment 52, thereby withdrawing the impaling pin 47 within one of the pockets 50, and slipping the potato therefrom. The potato falls upon chute or slide 58 which is attached to a transverse brace 59 of frame 18 and which is sloped downwardly and forwardly in the machine. It is evident from an inspection of FIGURE 1 that there is a single extractor for each hopper, and one hopper and one extractor constitute a part of one channel for the movement of potatoes in machine 10.

Shaft 34 is rotated in response to operation of electric motor 60. The motor is attached to base 22 of frame 18 and has a drive sprocket 62 attached to the output shaft thereof. Chain 63 is entrained around sprocket 62 and also entrained around a larger sprocket 64 which is fixed to shaft 65. (FIGURES 2 and 5.) Shaft 65 also has a smaller sprocket 67 fixed thereto, and chain 68 is engaged thereover. The chain is also engaged over sprockets 69, 70 and 71 that are secured to shafts 72, 73 and 34. This establishes a drive connection between motor 60 and the extractor assembly shaft 34 so that the extractor rotates in timed sequence with all other shafts and sprockets constituting a part of the drive line between the motor and the various movable parts of the machine.

Slide 58 was said to slope downwardly and forwardly of the machine. The slide has a lower wall 80 with a cutout 81 (FIGURE 2) therein, fitting over grooved roller 82. The roller has circumferential grooves 83 (FIGURE 4) therein, and it extends transversely across the frame of the machine. Shaft 72 has a jacket thereon configured to form the roller 82 and therefore the roller 82 is rotated in unison with the operation of the potato extractor assembly. The front edge of the side walls of chute or slide 58 fits closely adjacent to the periphery of drum 86. This drum is of special construction and includes a center shaft 65 which has been previously mentioned. This is the shaft having sprockets 64 and 67 thereon.

Structually, drum 86 is built up of a plurality of cylindrical drum sections 90 with adjacent drum sections having a space 91 therebetween. Essentially V-shaped and inwardly extending brackets 92 hold the cylindrical drum sections assembled as an elongate cylinder, and the end sections have end walls 94 fixed thereto and attached to hubs 95 (FIGURE 4) which are fixed to shaft 65. Conventional bearings 96 are attached to suitable frame members of frame 18, and one end of shaft 65 has the previously mentioned sprockets 64 and 67 fixed thereto. Accordingly, the drum is made sectional with spaces or slots 91 circumferentially formed therein.

A number of potato pockets 100 are in the drum 86, each pocket being defined by a pair of straps 101 and 102 which are in the form of hooks when viewed from the side (FIGURES 2 and 6) and portions of the straps extend inwardly of the drum. Transverse slots 104 (FIGURE 1) are formed in the straps 101 and 102 to provide clearance for lateral blades, such as blades 107, 108 and 109 (FIGURE 8) projecting from knives 110 and 111, respectively. The spacing of the straps forming the potato pocket 100 allows blades 110, 111 or 112 to pass freely therethrough as the drum rotates. The shapes of the three illustrated blades serve the obvious purpose of subdividing the potatoes in the pockets 100 into two pieces, three pieces, and four pieces, respectively, these being the most common subdivisions of seed potatoes. The blades are separably carried by a portion of frame 18 and located above roller 82. Portions of the blades project through slots 91 so that as the potato in pocket 100 is carried upward by a rotation of the drum, it is pushed through the knife blade or blades and subdivided in the pocket 100. As the drum continues to rotate, the subdivided potato is discharged as shown in FIGURE 2.

There are means in the machine for metering the potatoes as they move down slide 58. These means are shown best in FIGURES 2, 6 and 7 and consist essentially of shaft 73 having sprocket 71 thereon, the shaft extending completely across the frame of the machine and mounted for rotation in conventional bearings 122 and 123 (FIGURE 1). Each chute or slide 58 has a swinging gate, for instance, see typical gate 128 in FIGURES 2, 6 and 7. The gate is mounted for oscillation on transverse shaft 130 which is located above chute 58 and which spans the chute. The lower part of the gate extends to a position between the sides of the chute, and the gate is spring-biased by means of spring 134 to a rest position.

A gate operator 138, preferably made of a bar having knobs at the ends thereof, is attached to shaft 73 and it strikes the upper end of gate 128 when shaft 73 is rotated. The direction of rotation of shaft 73 is such that the bar 138 pivotally oscillates gate 128 in a direction so that spring 134 yieldingly opposes the movement of the gate and returns the gate to the rest position. The gate functions as a potato stop and is located in advance of the potato guide fingers 140 connected with the sides of chute or slide 58. However, when the gate is opened by being struck by bar 138, the potatoes are allowed to slide down the chute and into the cutting station defined by a portion of roller 82 and pocket 100 and the particular knife being used. Full metering takes place by the operation of side panels 152 and 154 (FIGURE 7) mounted on hinges 151 and 153, the hinges being carried by the sides of chute 58. Springs 157 and 158 are attached to pins 159 and 160 secured to the sides of slide 58 and to the panels 152 and 154, and the purpose of the springs is to yieldingly oppose the operation of the panels in one direction. The panels have abutments 163 and 164 fixed to the inner faces thereof, and these abutments are struck by the gate 128 as the gate is functioning, thereby opening the panels 152 and 154 against the yielding opposition of springs 157 and 158. This allows a potato which is oriented in groove 83 of roller 82 by rotation of the roller and constrained by the panels 152 and 154 to be released so that it may fall into the hooks of the approaching pocket 100.

Thereafter, the potato is conveyed and cut in the manner previously described.

Attention is now invited to FIGURE 9 showing a slight modification. In this form of the invention, machine 10-a differs from machine 10 only in one small particular. The roller 82-a has knife 112-a fixed thereto instead of being secured to a stationary part of the frame. Accordingly, the potato is cut while it is in pocket 100-a and at the bottom of chute 58-a. The relocation of knife 112-a which may be substituted by knives corresponding to knives 110 and 111 is the only substantial difference between machines 10 and 10-a.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A potato sectioning machine comprising a frame, a hopper carried by the said frame and having a discharge opening, a potato extractor carried by said frame and located operatively with respect to said hopper to extract potatoes therefrom, a chute carried by said frame and located adjacent to said extractor to receive potatoes from the extractor, said chute being inclined so that the potatoes slide down the chute when placed thereon, a rotary drum carried by said frame and having potato receiving pockets therein, severing means mounted adjacent to said drum for severing the potatoes while they remain in the pockets thereof, means carried by said frame and associated with said chute for metering the movement of potatoes down said chute so that the potatoes are individually fed into said pockets, said metering means including side panels, means movably mounting said side panels on the discharge end of said chute for movement toward and away from each other, means resiliently urging said side panels toward each other for embracing a single potato disposed therebetween, a depending gate extending transversely of said chute between said side panels and pivotally mounted at its upper end for rotation about an axis extending transversely of said chute, and means for intermittently pivoting the lower end of said gate away from said chute between said side panels simultaneously moving the free ends of said side panels away from each other.

2. The subject matter of claim 1 wherein there are mechanical drive means connected with said drum, said gate and said extractor for mechanically timing the operation of each of said drum, said metering means and said extractor.

3. A potato sectioning machine comprising a frame, a hopper carried by the said frame and having a discharge opening, a potato extractor carried by said frame and located operatively with respect to said hopper discharge opening to extract potatoes therefrom, a chute carried by said frame and located adjacent to said extractor to receive potatoes from the extractor, said chute having an inclined bottom wall so that the potatoes slide down the chute when placed thereon, a rotary drum carried by said frame and having potato receiving pockets therein, severing means mounted adjacent to said drum for severing the potatoes while they remain in the pockets thereof, means carried by said frame and associated with said chute for metering the movement of potatoes down said chute so that the potatoes are individually fed into said pockets, said metering means including side panels, means movably mounting said side panels on the discharge end of said chute for movement toward and away from each other, means resiliently urging said side panels toward each other for embracing a single potato disposed therebetween, a gate swingable about a horizontally disposed axis extending transversely of said chute and having a lower end disposed in said chute, resilient means reacting on said gate and opposing the movement of the lower end of said gate away from said bottom wall returning gate to an initial rest position adjacent said bottom wall at which said chute is blocked, and means for intermittently pivoting the lower end of said gate away from said bottom wall between said side panels for simultaneously moving the free ends of said side panels away from each other.

4. The combination of claim 1 including a roller carried by said frame and having a peripheral groove therein, the free ends of said side panels being disposed closely adjacent the upper surface of said roller and extending transversely of the latter, said chute bottom having an opening in registry with said groove of said roller so that the potato passed by said gate is oriented and kept in motion as it falls onto said roller.

5. The subject matter of claim 4 wherein said potato pocket is composed of an essentially hook-shaped member adjacent to the periphery of the drum and into which the potato is adapted to nest as the hook-shaped member passes said roller.

6. The subject matter of claim 5 wherein said potato severing means includes a knife, said drum having a circumferential slot into which a portion of the knife extends, said hook-shaped member having a slot therein in alignment with the slot in said drum to provide passage for the knife.

7. An inclined metering chute for intermittently dispensing potatoes to be cut from the lower end of said chute, said chute including a bottom and opposite upstanding side walls, said side walls terminating a spaced distance from the lower end of said bottom wall and including a pair of extension side panels swingably secured thereto for movement on their free lower ends toward and away from each other transversely of said bottom wall, a depending gate swingably mounted on the upper end portion of said gate above the discharge end of said chute with the lower free end of said gate extending between the free end of said side panels and swingable toward and away from said bottom panel, actuating means effecting intermittent oscillation of said gate and coacting means carried by said gate and side panels moving the free ends of said side panels away from each other in response to swinging movement of said gate away from said bottom wall.

8. An inclined metering chute for intermittently dispensing potatoes to be cut from the lower end of said chute, said chute including a bottom and opposite upstanding side walls, said side walls terminating a spaced distance from the lower end of said bottom wall and including a pair of extension side panels swingably secured thereto for movement on their free lower ends toward and away from each other transversely of said bottom wall, a gate, means mounting said gate for oscillation toward and away from said bottom wall between the free ends of said side panels, and coacting means carried by said gate and side panels moving the free ends of said side panels away from each other in response to movement of said gate away from said bottom wall.

References Cited in the file of this patent

UNITED STATES PATENTS

| | | |
|---|---|---|
| 1,223,254 | Burks | Apr. 17, 1917 |
| 1,417,273 | Marquez | May 23, 1922 |
| 2,226,071 | Oldenburg | Dec. 24, 1940 |
| 2,296,645 | Marsden | Sept. 22, 1942 |
| 2,395,350 | Smith | Feb. 19, 1946 |
| 2,923,337 | Jouin | Feb. 2, 1960 |